Patented Aug. 16, 1932

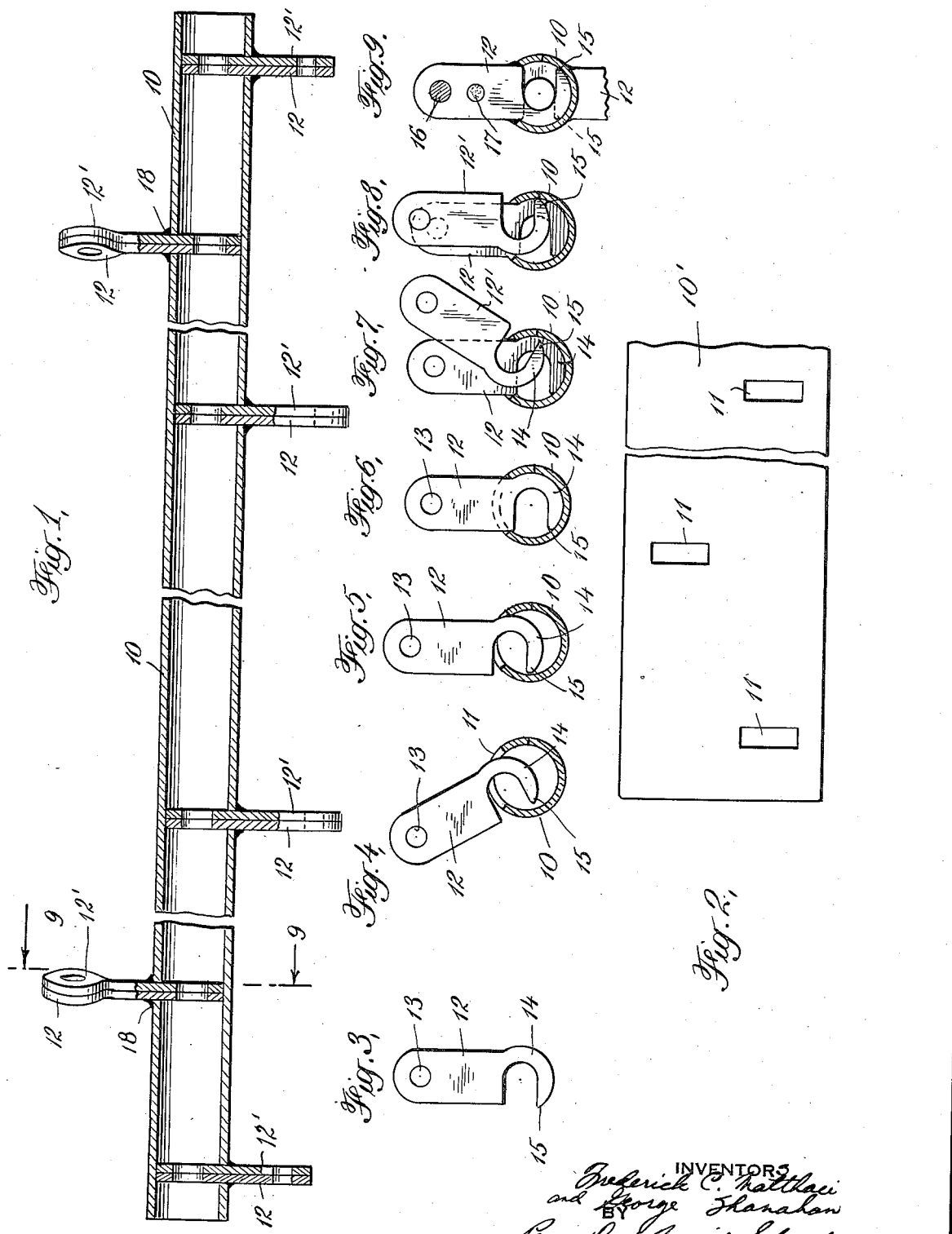

1,871,727

UNITED STATES PATENT OFFICE

FREDERICK CARL MATTHAEI AND GEORGE DANIEL SHANAHAN, OF DETROIT, MICHIGAN, ASSIGNORS OF ONE-HALF TO AMERICAN METAL PRODUCTS COMPANY, A CORPORATION OF MICHIGAN AND ONE-HALF TO MOTORS METAL MANUFACTURING COMPANY, A CORPORATION OF MICHIGAN

BRAKE CROSS SHAFT ASSEMBLY AND METHOD OF MAKING THE SAME

Application filed October 8, 1930. Serial No. 487,164.

This invention relates to a cross shaft for operating plural brakes of an automobile or the like, and to the method of making the same.

In the manufacture of brake cross shafts for automobiles, it has been the common practice heretofore to employ a solid steel shaft in which a number of keyways have been cut for the reception of keys to locate the forged steel levers adapted to be connected to the brake and pedal rods for operating the brakes in response to the manipulations of the brake pedal or lever by the operator of the automobile. The solid shaft was made very heavy in order to provide the requisite strength and rigidity, and an excessive amount of machining was required for finishing the rough forgings and for cutting the keyways for the reception of the keys which locate the levers. Fracture of the assembly at the keyway, which was the weakest point, deprived the operator of the use of the corresponding brake or brakes and as a result control of the car was lost, with dangerous results. Furthermore, the present forms of solid brake shafts require costly bearings, and are difficult to lubricate properly.

The brake cross shaft of this invention overcomes the objections to the solid form of brake shaft employed heretofore, and is light and strong, and simple and inexpensive to manufacture in accordance with a novel method.

The brake cross shaft made in accordance with this invention is distinctive in that its primary element is a tube, and in this respect it resembles the brake cross shaft disclosed in a copending application, Serial No. 487,146 filed October 8th, 1930, by F. C. Matthaei, one of the present applicants.

In accordance with this invention the new brake cross shaft is fabricated from a sheet of steel punched to the required dimensions for formation into a tube, and provided at proper intervals with slots for the reception of the levers.

The blank is then rolled into a tube, and the seam is welded to complete the tube, which then contains a plurality of slots spaced at intervals along the length thereof for the reception of the required number of levers, alternate ones of which are adapted to project from opposite sides of the tube. In an alternative arrangement, standard commercial seamless or welded tubing may be pierced at proper intervals with the slots for the reception of the levers.

The levers are each formed in two parts to enable the same to be inserted in the slots, after which the two parts are welded together to form an integral level. The two parts of the split lever are stamped from sheet metal, and are exactly alike, so that blanks of a common shape may be used to assemble all of the levers in place on the tube. Each part of this split lever consists of a shank having an eye at one end for the reception of the brake rod clevis pin, and a hook on the other end whose curvature is equal to the interior dimensions of the tube so that the hook will fit snugly therein.

The thickness of each half lever is half the width of the slot, so that in assembling, the hook of one of the half levers is inserted in the tube slot at an angle until the tip of the hook engages the inner surface of the tube opposite the slot, whereupon the half lever is rotated, so that the shank of the same fits closely within the tube slot. Then the second half lever is inserted in the same way but in a reverse direction, that is, the tip of the hook is inserted from the opposite side, so that when the two halves of the split lever are moved into juxtaposition and secured together, they cannot be withdrawn from the slot, as the hooks of each cooperate to form an enlarged eye or head fitting closely within the tube, which is larger than the slot and so prevents the split lever from being withdrawn therefrom. This operation is repeated until all of the levers along the entire shaft have been properly assembled in position.

Then the two halves of each split lever are exactly aligned by temporarily inserting a pin through the eye of each for that purpose, and they are spot-welded together to form an integral lever which is securely locked within the tube because of the cooperation of the complementary hooks to form a disc or head. The shanks of the levers are then welded to the outside of the tube so that a unitary and homogeneous tubular brake cross shaft is formed which is considerably lighter, simpler, and more inexpensive to manufacture than the solid steel rod type used heretofore.

The details of construction of the new brake cross shaft and the novel method of making the same may be better understood by reference to the accompanying drawing, in which Figure 1 is an axial section through the novel brake cross shaft made in accordance with the invention;

Fig. 2 is a fragmentary view of the brake shaft blank before being rolled into the tube;

Fig. 3 illustrates one of the blanks, two of which constitute the single split lever;

Figs. 4 to 8, inclusive, illustrate successive steps during the assembly of the brake shaft; and Fig. 9 is a cross-section of the finished shaft as seen along line 9—9 of Fig. 1.

Referring to Fig. 2, numeral 10' designates the cross shaft blank stamped from sheet metal and punched with the slots 11 for receiving the levers, this blank having a width equal to the perimeter of the finish brake shaft tube, and the slots 11 being placed in such a position that alternate levers project from opposite sides of the shafts and are spaced along it.

The tube blank 10' is then rolled into tubular form in the usual way and the seam is welded to form a complete welded tube 10 having the dimensions mentioned, and having the slots 11 at spaced intervals in the wall thereof as shown in Fig. 4. Though the formation of the parts of the brake cross shaft of this invention is preferably accomplished by stamping from sheet metal and therefore the welded tube is preferred, in many instances a commercial welded or seamless tube may be employed with equal facility, and in that case the slots 11 are pierced at the proper points in the wall of the tubing after the tube has been completed. This invention comprehends either method of preparing the tube for the reception of the levers.

One of the half lever blanks 12 which make up the split levers is shown in detail in Fig. 3 and consists of a shank having an eye 13 at one end for the reception of the brake rod clevis pin, and a hook 14 at the other end whose outside radius is equal to the radius of the interior of the tube 10 when it is completed. It will be seen that the shank of the half lever 12 is narrower than the outside width of the hook 14, that is to say, it is substantially equal in width to the width of the slot 11, which is less than the interior diameter of the tube 10 and therefore narrower than the hook 14. The tip 15 of the hook 14 of the half lever 12 preferably extends not further laterally than the side of the shank of the half lever 12. Two of these half levers 12 are used together to form a lever, and accordingly, the thickness of each is substantially equal to half the axial depth of the slots 11 in the finished tube 10.

The first step in the assembling process comprises inserting one of the half levers in a slot 11 of the tube 10. This is accomplished by first inserting the tip 15 of the half lever hook 14 at an angle into the slot 11 in the manner shown illustrated by Fig. 4. Then the half lever 12 is straightened out as shown in Fig. 5, and dropped through the slot 11 until the bottom of the hook 14 engages the interior surface of the tube so as to lie snugly therein with the shank fitting snugly in the slot 11 as illustrated in Fig. 6. The half lever 12 lying in the position shown in Fig. 6 is locked against clockwise rotation, but not against counterclockwise rotation in the tube.

The next step consists of inserting a second half lever 12' through the slot 11 in position reversed from the first half lever, that is to say, the tip 15 of the hook 14 is inserted from the side opposite to that from which the first half lever was inserted as shown in Fig. 7, and the process is repeated as shown in Fig. 8 until the second half lever lies juxtaposed upon the first half lever as shown in Fig. 9, the shank thereof fitting snugly within the slot 11, and the curved hook 14 lying snugly against the inner surface of the tube 10. This second half lever is locked in the tube against rotation in a direction opposite that of the first blank, that is, against rotation in a counterclockwise direction. This is repeated until all of the split levers are assembled in the corresponding slots 11 in the tube 10.

After all of the levers have been assembled in their proper position on the tube 10, the eyes 13 of the halves of each assembled split lever lie in registration. A pin 16 is then preferably inserted through these eyes 13 to arrange them in perfect alignment, and they are spot welded together as at 17. Because of this exact alignment of the two halves of each lever, equal pull on both halves of the lever by the brake rod clevis is insured. Inasmuch as one half of each split lever is locked against rotation in one direction, and the other half is locked against rotation in the opposite direction, the levers can never pull out, as the disc-like heads provided by the cooperating hooks 14 of the two lever halves is larger than the corresponding slot 11, so that the levers are permanently locked in place. If desired, the shanks of the levers may be welded to the outer surface of the tube 10 at 18, as shown in Fig. 1. Also, the eyes of certain of the levers may be bent at an angle as shown in Fig. 1 to compensate for the angles which the corresponding brake rods assume on the automobile.

It will be seen that the new brake cross shaft made in accordance with the process of this invention is extremely light, although very strong, inexpensive and simple to manufacture, rugged and not likely to get out of order.

Inasmuch as the shaft 10 is tubular, it permits the use of an internal bearing, and facilitates the lubrication to insure freedom of action and also reduces the cost of the bearing itself. If any of the spot welds 17 should fracture because of any extraordinary shock or the like, the two halves of each lever are still held together by the clevis pin of the brake rod, and the two halves being locked together against rotation in either direction, the levers cannot loosen or fall out of position, and so the operator of the vehicle does not lose control because of this defect in the braking system. If weld 18 should fracture the levers cannot fall out or loosen because the disc-like heads thereof are secured in the tube.

While a preferred embodiment of this invention both in the article and process has been described herein, it is to be understood that the invention is not to be limited thereby, but is susceptible of various changes in form and detail within its scope.

We claim:

1. In a shaft for operating brakes and the like, the combination of a tube having a slot therein, and a pair of complementary elements secured in the slot and joined to form a single lever.

2. In a shaft for operating brakes and the like, the combination of a tube having a slot therein, and a pair of connected complementary elements each secured in said tube and projecting from the slot to form a single lever.

3. In a shaft for operating brakes and the like, the combination of a tube having a slot therein, a pair of complementary elements inserted in the slot, each of said elements locking the other against displacement, and means securing said elements together to form a single lever.

4. In a shaft for operating brakes and the like, the combination of a tube having a slot therein, a pair of complementary elements inserted in the slot, means on each of said elements conforming to the interior of said tube to lock the corresponding element therein, and means for securing the elements together outside of the tube to form a lever.

5. In a shaft for operating brakes and the like, the combination of a tube having a slot therein, a pair of complementary elements inserted in the slot, a hook on each of the elements permitting inserting thereof into the slot, and partially locking the corresponding element in the tube, and means for securing the elements together to form a lever.

6. In a shaft for operating brakes and the like, the combination of a tube having a slot therein, a pair of complementary elements inserted in the slot and having oppositely directed hooks jointly conforming to the interior of said tube to lock the elements therein, and means for securing the elements together to form a lever.

7. In a shaft for operating brakes and the like, the combination of a tube, a plurality of slots therein, and a lever secured in each of said slots, each of said levers comprising two complementary elements secured together and having an oppositely directed hook jointly forming a head conforming to the interior of said tube to lock the elements therein.

8. The method of forming a shaft for operating brakes and the like, which comprises inserting through a slot in a tube an element having a portion for locking the element within the tube, inserting a like element in said slot, and securing the elements together to form a lever.

9. The method of forming a shaft for operating brakes and the like, which comprises inserting through a slot in a tube an element having a portion partially conforming to the interior of said tube, inserting in said slot a second element having a portion conforming to another part of the interior of said tube, and securing said elements together to form a lever.

10. The method of forming a shaft for operating brakes and the like, which comprises inserting through a slot in a tube an element having a hook for partially locking the same within the tube, inserting in the slot a second like element with the hook thereof directed in the opposite direction, and securing said elements together to form a split lever whose parts lock each other against withdrawal from the slot.

11. The method of forming a shaft for operating brakes and the like, which comprises punching slots in a sheet of metal, rolling the sheet into a tube, welding the seam thereof, inserting in each slot a pair of complementary elements having enlarged portions for locking them in said tube, and welding each pair of elements together to form single levers.

12. In a shaft for operating brakes and the like, the combination of a tube having a slot therein, a pair of complementary elements extending through said slot, and means on said elements for jointly locking them in the tube to form a single lever projecting from the tube.

13. In a shaft for operating brakes and the like, the combination of a tube having a slot therein, a pair of complementary elements extending through said slot, connections between said elements, and means on each element for locking the other element in said tube when they are connected together.

14. In a shaft for operating brakes and the like, the combination of a tube having a slot therein, a pair of complementary elements extending through said slot, means on one lever for securing it in the tube against movement in one direction, means on the other element for securing it in the tube against movement in the opposite direction, and connections between said elements whereby the lever formed by the two elements is locked against movement in either of said directions.

In testimony whereof we affix our signatures.

FREDERICK CARL MATTHAEI.
GEORGE DANIEL SHANAHAN.